United States Patent
Yamamoto

(10) Patent No.: US 10,371,942 B2
(45) Date of Patent: Aug. 6, 2019

(54) HEADS-UP DISPLAY DEVICE

(71) Applicant: FUJIFILM Corporation, Tokyo (JP)

(72) Inventor: Chikara Yamamoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 50 days.

(21) Appl. No.: 15/624,281

(22) Filed: Jun. 15, 2017

(65) Prior Publication Data

US 2018/0024357 A1    Jan. 25, 2018

(30) Foreign Application Priority Data

Jul. 25, 2016 (JP) ................ 2016-145208

(51) Int. Cl.
  *G02B 27/01* (2006.01)
  *G02B 13/16* (2006.01)
  *G06T 3/20* (2006.01)
  *G06T 3/40* (2006.01)

(52) U.S. Cl.
  CPC ......... *G02B 27/0101* (2013.01); *G02B 13/16* (2013.01); *G02B 27/0149* (2013.01); *G02B 27/0179* (2013.01); *G06T 3/20* (2013.01); *G06T 3/40* (2013.01); *G02B 2027/0145* (2013.01); *G02B 2027/0154* (2013.01)

(58) Field of Classification Search
  CPC ........... G02B 27/0101; G02B 13/16; G02B 27/0149; G02B 27/0179; G02B 2027/0145; G02B 2027/0154; G06T 3/20; G06T 3/40
  See application file for complete search history.

(56) References Cited

U.S. PATENT DOCUMENTS

| 2006/0056064 A1* | 3/2006 | Shafer ............... G02B 13/143 359/727 |
| 2012/0050269 A1* | 3/2012 | Awaji ............... G02B 27/2228 345/419 |
| 2017/0336552 A1* | 11/2017 | Masuda ............... G02B 27/02 |

FOREIGN PATENT DOCUMENTS

JP    H06-115381 A    4/1994

* cited by examiner

*Primary Examiner* — Chong Wu
(74) *Attorney, Agent, or Firm* — Studebaker & Brackett PC

(57) ABSTRACT

There is provided a head-up display device that reflects and enlarges an image, which is displayed on an image display element, by a curved mirror, allows an observer to visually recognize the image as a virtual image, can change a virtual image display position, and is small. A head-up display device, which reflects and enlarges a displayed primary display image by a curved mirror and allows an observer to visually recognize the primary display image as a virtual image, includes a virtual-image-position change portion of changing a distance between the observer and the virtual image and a display-size change portion of changing the display size of the primary display image, and is adapted to satisfy the following conditional expression (1).

$$2.5 < (Hf/Hn)/(Bf/Bn) < 15.0 \qquad (1)$$

20 Claims, 7 Drawing Sheets

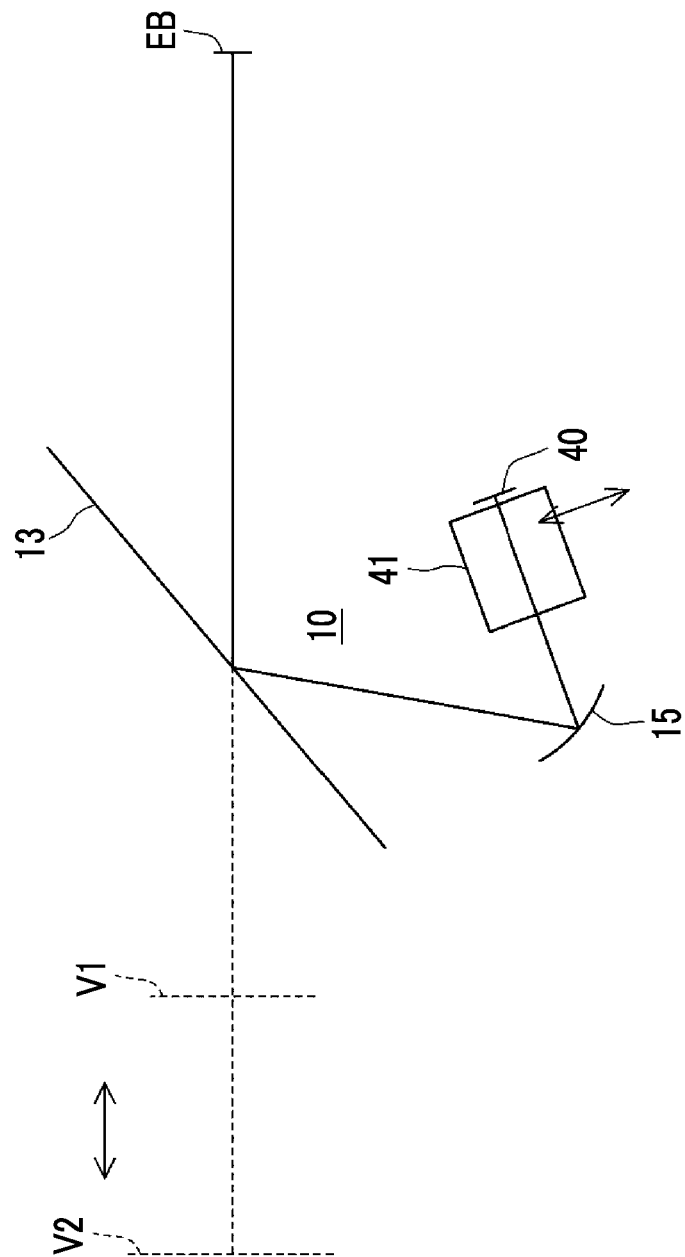

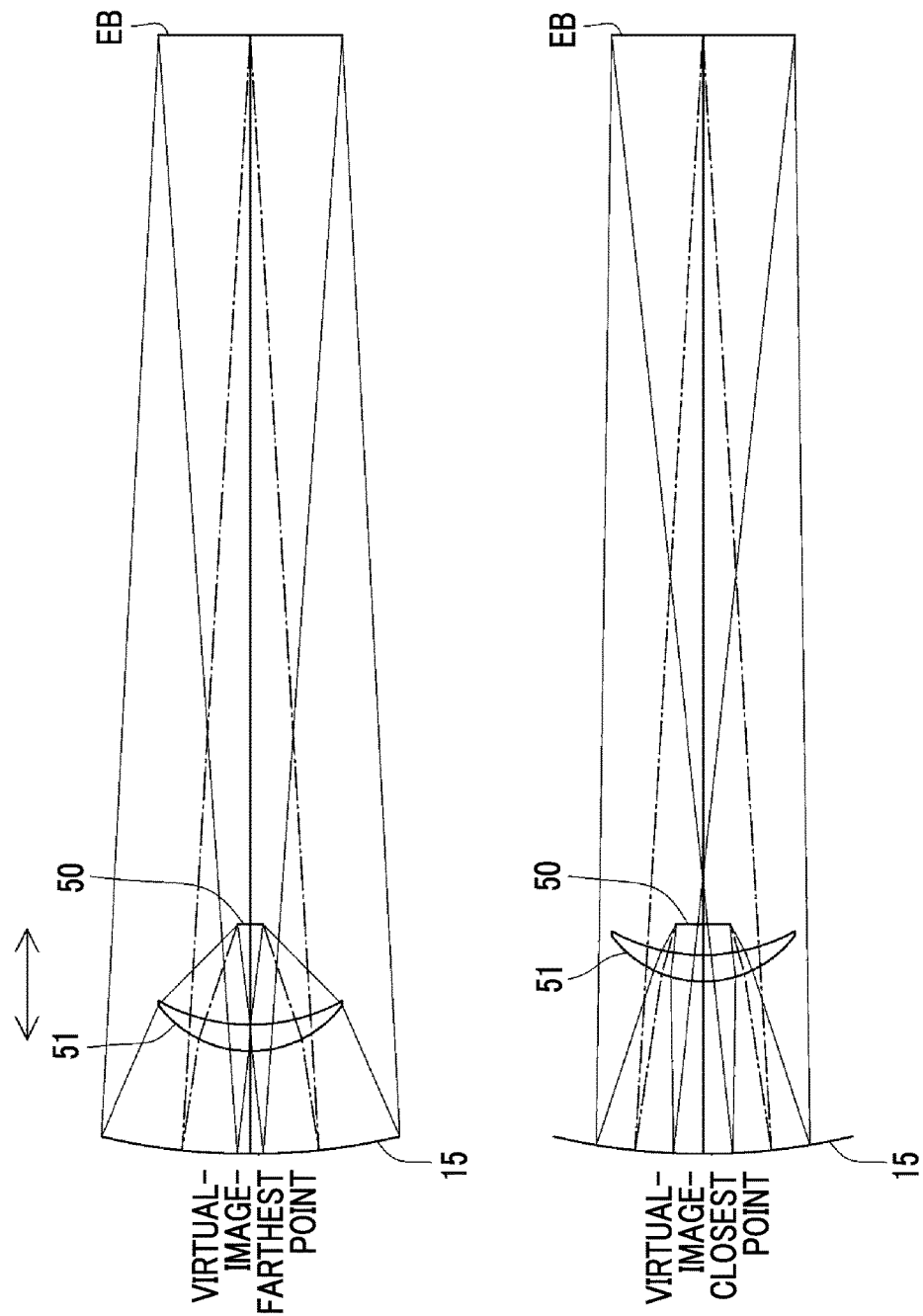

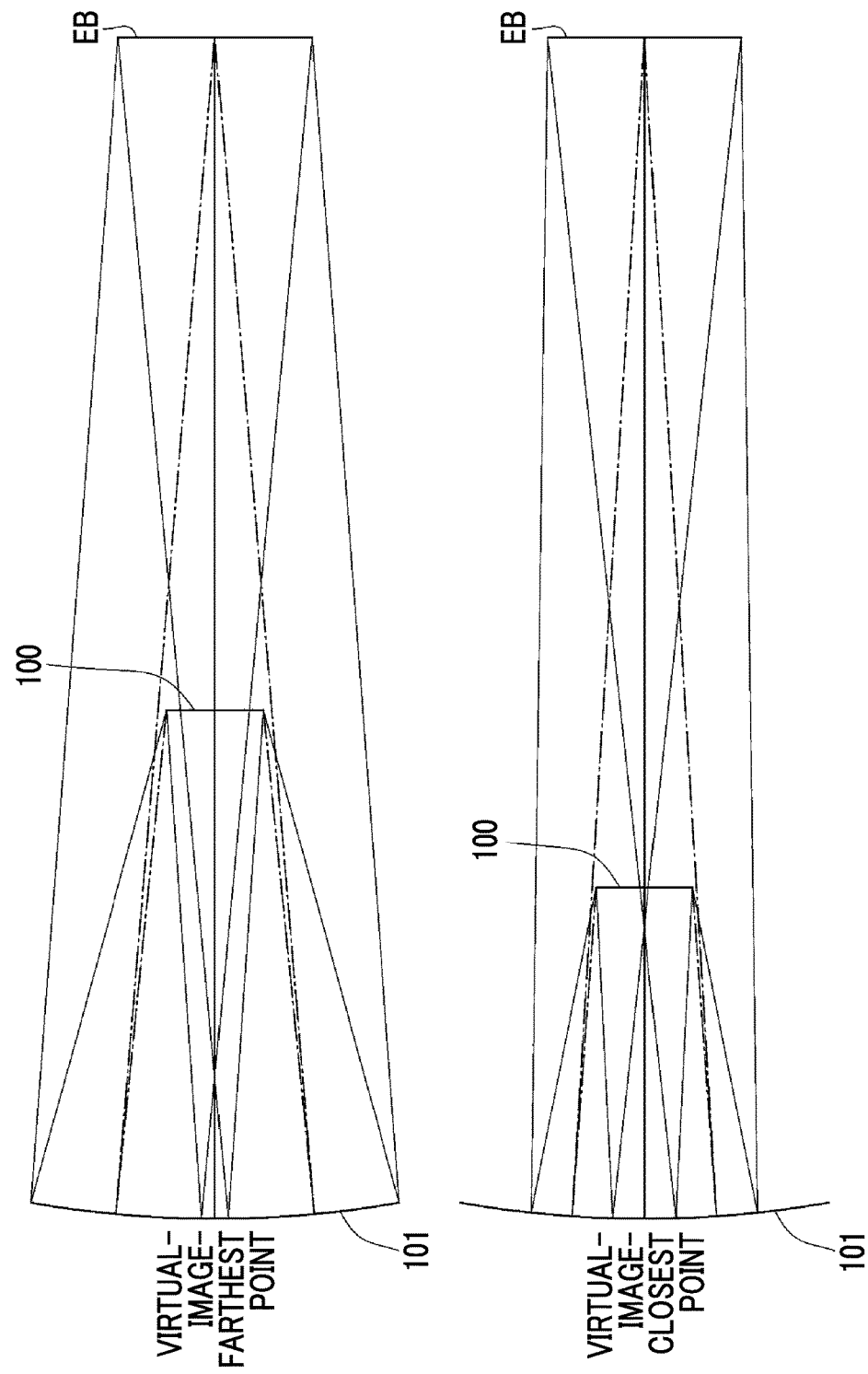

HEADS-UP DISPLAY DEVICE

CROSS-REFERENCE TO RELATED APPLICATIONS

The present application claims priority under 35 U.S.C. § 119 to Japanese Patent Application No. 2016-145208, filed on Jul. 25, 2016. Each of the above application(s) is hereby expressly incorporated by reference, in its entirety, into the present application.

BACKGROUND OF THE INVENTION

1. Field of the Invention

The present invention relates to a head-up display device that reflects and enlarges an image, which is displayed on an image display element, by a curved mirror to allow an observer to visually recognize the image as a virtual image.

2. Description of the Related Art

In the past, a head-up display device has been known as a device that displays information, such as the indication of a direction, calling for attention, and/or a travel speed, to a driver of an automobile or the like. The head-up display device is to project the virtual image of an image, which is to be displayed, onto the image-reflecting surface of a front window, a combiner, or the like so that a driver recognizes information required for the driving of an automobile or the like without taking his eyes off from the field of view.

When the virtual image of information, which is preferable to be displayed within the field of view on the front side of a driver as in the case of the information, such as the indication of a direction and/or calling for attention, among information which is displayed by the head-up display device, is displayed at a position distant from the image-reflecting surface, the movement of eyes and/or the focus of a driver can be suppressed.

On the contrary, when the virtual image of information, which is preferable to be displayed near the console of an automobile as in the case of the information, such as a travel speed, is displayed at a position close to the image-reflecting surface, the movement of eyes and/or the focus of a driver can be suppressed.

Further, the position of a target, which can be visually recognized by a driver, is changed according to a travel speed, and it is generally known that the position of a target, which can be visually recognized by a driver, is close to the image-reflecting surface at the time of a low speed and is distant from the image-reflecting surface at the time of a high speed. For this reason, when the position of the virtual image is changed to a position, which is close to or distant from the image-reflecting surface, according to a speed, the movement of eyes and/or the focus of a driver can be suppressed.

JP1994-115381A (JP-H06-115381A) is proposed as a head-up display device that can display a virtual image at a plurality of positions of which distances from the image-reflecting surface are different from each other. It is preferable that the size of the virtual image is displayed so as to be enlarged in comparison with the size of an image which is displayed on an image display element for the purpose of the improvement of visibility in the head-up display device. In this case, since an image displayed on the image display element needs to be enlarged and projected onto the image-reflecting surface through a curved mirror, JP1994-115381A (JP-H06-115381A) also discloses a device including a curved mirror.

SUMMARY OF THE INVENTION

The structure of the head-up display device in the related art will be described here with reference to FIG. 7. FIG. 7 is a top light-path view showing a positional relationship of an image display element 100, a curved mirror 101, and an eye box EB (a region in which a virtual image can be observed) in a case in which the position of a virtual image is changed. An image-reflecting surface is not shown in FIG. 7.

An image displayed on the image display element 100 is enlarged and projected onto the image-reflecting surface through the curved mirror 101 and the image projected onto the image-reflecting surface is observed from the eye box EB, so that a virtual image displayed by the head-up display device is visually recognized.

In the head-up display device having this structure, the change of the display position of the virtual image is generally performed by the change of an interval between the image display element 100 and the curved mirror 101. Specifically, in a case in which a virtual image is to be displayed at a position distant from the image-reflecting surface, an interval between the image display element 100 and the curved mirror 101 is made large as shown on the upper stage of FIG. 7. In a case in which a virtual image is to be displayed at a position close to the image-reflecting surface, an interval between the image display element 100 and the curved mirror 101 is made small as shown on the lower stage of FIG. 7.

Here, as known from the comparison between the upper stage of FIG. 7 and the lower stage of FIG. 7, if the display size of the image display element 100 is constant, the use range of the curved mirror 101 in a case in which a virtual image is to be displayed at a position distant from the image-reflecting surface is wider than that in a case in which a virtual image is to be displayed at a position close to the image-reflecting surface. Accordingly, in order to cope with a virtual image from the position of a virtual-image-closest point up to the position of a virtual-image-farthest point by the curved mirror 101, the size of the curved mirror 101 should be determined so as to correspond to the use range at the position of the virtual-image-closest point. For this reason, the size of the curved mirror 101 has tended to increase in size.

Generally, since the head-up display device should be installed in a space limited around a driver's seat of a vehicle, such as an automobile, the head-up display device is required to have a small size. However, since an increase in the size of the curved mirror 101 is opposed to a request for a reduction in the size of the device, improvement is demanded.

The invention has been made in consideration of the above-mentioned circumstances, and an object of the invention is to provide a head-up display device that reflects and enlarges an image, which is displayed on an image display element, by a curved mirror, to allow an observer to visually recognize the image as a virtual image, can change a virtual image display position and is small.

A head-up display device of the invention reflects and enlarges a displayed primary display image by a curved mirror to allow an observer to visually recognize the primary display image as a virtual image. The head-up display device includes a virtual-image-position change portion of changing a distance between the observer and the virtual image, and a display-size change portion of changing a display size of the primary display image. The following conditional expression (1) is satisfied.

$$2.5 < (Hf/Hn)/(Bf/Bn) < 15.0 \quad (1)$$

where, Hf: the size of the primary display image in an arbitrary direction when the virtual image is displayed at a position of the farthest point farthest from the observer Hn: the size of the primary display image in the arbitrary direction when the virtual image is displayed at a position of the closest point closest to the observer Bf: the display magnification of the virtual image at the position of the farthest point Bn: the display magnification of the virtual image at the position of the closest point.

Here, "the size in the arbitrary direction" means the size of either of the horizontal size and the vertical size of the primary display image corresponding to a horizontal direction and a vertical direction at the time of display of a virtual image, and at least one of the two image sizes may satisfy the conditional expression (1).

Further, "the display magnification of the virtual image" means a ratio of the size of an image in an arbitrary direction expressed in the following expression.

Display magnification=size of primary display image/display size of virtual image It is preferable that the head-up display device of the invention satisfies the following conditional expression (1-1).

$$3.5 < (Hf/Hn)/(Bf/Bn) < 12.0 \quad (1-1)$$

Further, the primary display image may be an image that is formed as an intermediate image on the basis of image information by an optical system.

In a case in which the primary display image is the intermediate image, it is preferable that the head-up display device includes a diffuser provided at a formation position of the intermediate image.

Further, in a case in which the primary display image is the intermediate image, the optical system may be a projection optical system that forms an image, which is displayed on an image display element, as the intermediate image, and the projection optical system may include a plurality of lenses, change the position of the virtual image by moving at least a part of the lenses along an optical axis to move the formation position of the intermediate image, and function as the virtual-image-position change portion.

Furthermore, in a case in which the primary display image is the intermediate image, the optical system may be a projection optical system that forms an image, which is displayed on the image display element, as the intermediate image, and the projection optical system may include a plurality of lenses, change the display size of the intermediate image by moving at least a part of the lenses along the optical axis, and function as the display-size change portion.

In a case in which the primary display image is the intermediate image, for example, an image, which is formed on the basis of image information by scanning using a laser beam or the like, can also be used as the primary display image without being limited to the above description.

Further, in the head-up display device of the invention, the primary display image may be an image displayed on an image display element.

Furthermore, a reflecting member, which is provided on a light path between the primary display image and the curved mirror and changes the length of the light path between the primary display image and the curved mirror, may be provided as the virtual-image-position change portion.

Further, a transparent medium, which is provided on a light path between the primary display image and the curved mirror and changes the length of an air-conversion-light path between the primary display image and the curved mirror, may be provided as the virtual-image-position change portion.

Furthermore, a lens, which is provided on a light path between the primary display image and the curved mirror and changes a projection magnification of the primary display image at the curved mirror, may be provided as the virtual-image-position change portion.

A head-up display device of the invention reflects and enlarges a displayed primary display image by a curved mirror to allow an observer to visually recognize the primary display image as a virtual image. The head-up display device includes a virtual-image-position change portion of changing a distance between the observer and the virtual image, and a display-size change portion of changing a display size of the primary display image. The following conditional expression (1) is satisfied. Accordingly, a head-up display device, which can change a virtual image display position and is small, can be obtained.

$$2.5 < (Hf/Hn)/(Bf/Bn) < 15.0 \quad (1)$$

BRIEF DESCRIPTION OF THE DRAWINGS

FIG. 5 is a diagram showing the schematic structure of a head-up display device according to a third embodiment of the invention.

FIG. 6 is a top light-path view showing a positional relationship of main components of a head-up display device according to a fourth embodiment of the invention.

FIG. 7 is a top light-path view showing a positional relationship of main components of a head-up display device in the related art.

DESCRIPTION OF THE PREFERRED EMBODIMENTS

Figure 1:
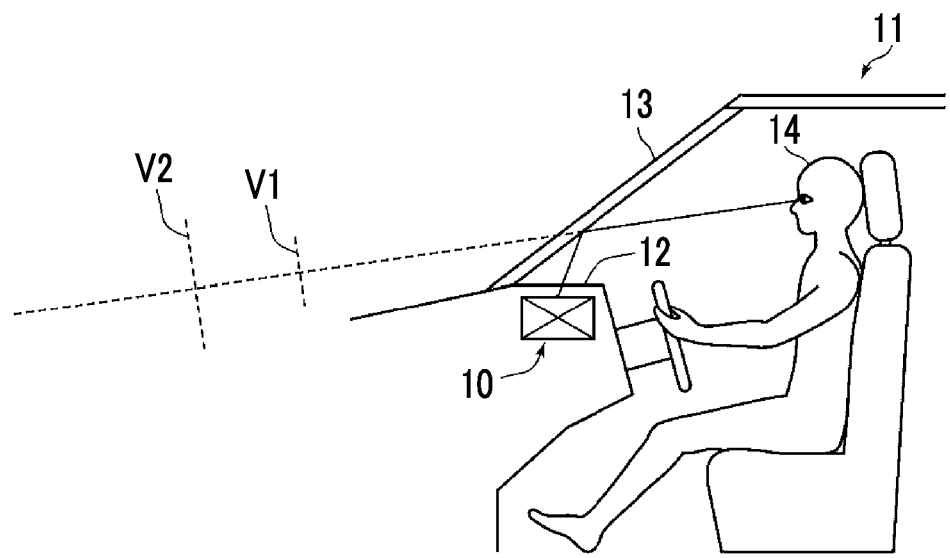
FIG. 1 is a schematic diagram of a driver's seat of an automobile on which a head-up display device according to a first embodiment of the invention is mounted.
Figure 2:
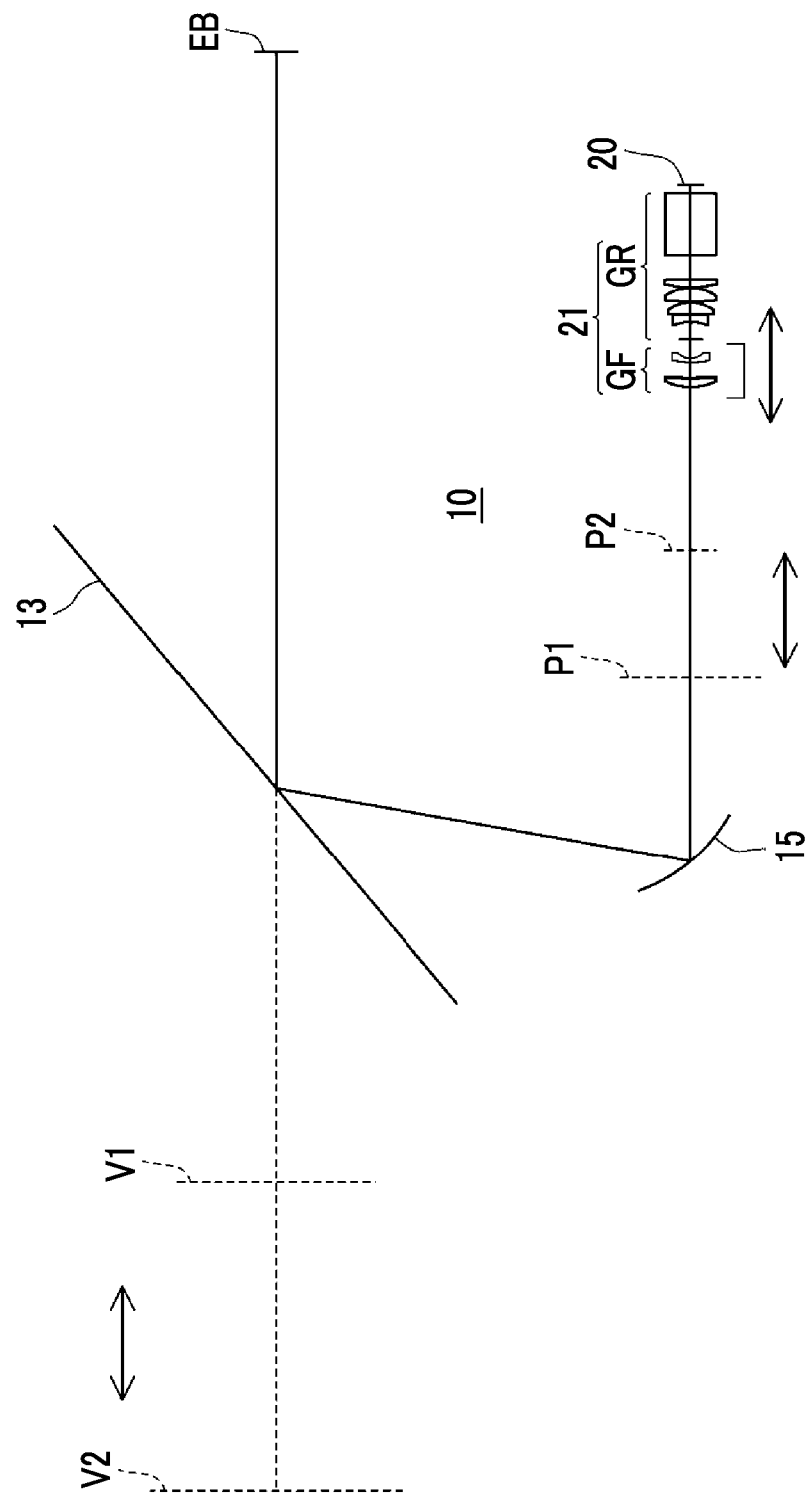
FIG. 2 is a diagram showing the schematic structure of the head-up display device.
Figure 3:
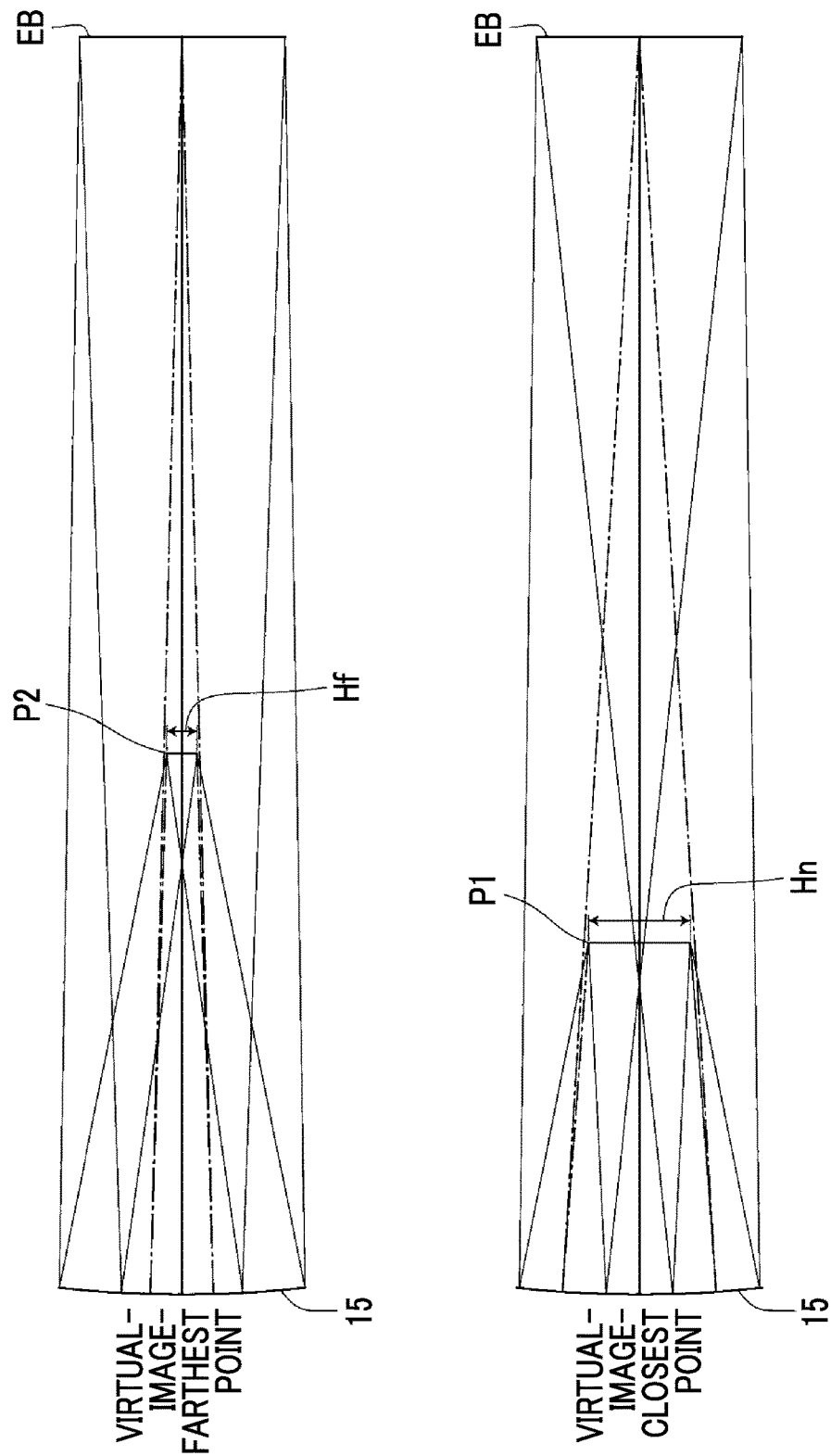
FIG. 3 is a top light-path view showing a positional relationship of main components of the head-up display device.

Embodiments of the invention will be described in detail below with reference to drawings. FIG. 1 is a schematic diagram of a driver's seat of an automobile on which a head-up display device according to a first embodiment of the invention is mounted, FIG. 2 is a diagram showing the schematic structure of the head-up display device, and FIG. 3 is a top light-path view showing a positional relationship of main components of the head-up display device.

As shown in FIG. 1, the head-up display device 10 of this embodiment is disposed in a dashboard 12 of an automobile 11, and reflects an image, which is sent from the inside of the device and represents information, such as a travel speed, by a front window (image-reflecting surface) 13 and enlarges and displays the image as a virtual image (a closest-point-virtual image V1 and a farthest-point-virtual image V2 are shown in FIG. 1) on the front side of a driver (observer) 14 beyond the front window 13.

In regard to the image-reflecting surface, the image may be reflected to the driver by a transparent reflecting member (combiner), which is disposed separately from the front window, instead of the front window 13. Further, the head-up display device 10 is not limited to the disposition of the head-up display device 10 that is disposed in the dashboard 12.

The head-up display device 10 reflects and enlarges a displayed primary display image by a curved mirror to allow the observer to visually recognize the primary display image as a virtual image. As shown in FIG. 2, the head-up display device 10 includes an image display element 20, a projection optical system 21 that includes a plurality of lenses, and a curved mirror 15.

In the head-up display device 10 of this embodiment, the primary display image is an image that is obtained by forming the image, which is displayed on the image display element 20, as an intermediate image with the projection optical system 21. An intermediate image display position P1 corresponding to the closest-point-virtual image V1 and an intermediate image display position P2 corresponding to the farthest-point-virtual image V2 are shown in FIG. 2.

It is preferable that the projection optical system 21 changes the position of the virtual image by moving at least a part of the lenses along an optical axis to move the formation position of the intermediate image and functions as a virtual-image-position change portion. Further, it is preferable that the projection optical system 21 changes the display size of the intermediate image by moving at least a part of the lenses along the optical axis and functions as a display-size change portion.

Here, a projection optical system, which includes a front group GF and a rear group GR and moves the formation position of an intermediate image or changes the display size of the intermediate image by moving all or only a part of the front group GF along an optical axis, has been exemplified as an example of the projection optical system 21. However, the structure of the projection optical system 21 is not limited to this structure, and the structure of a publicly known projection optical system can be appropriately applied to the structure of the projection optical system 21.

The head-up display device may further include a diffuser that is provided at the formation position of the intermediate image. According to this aspect, the range of an eye box EB (a region in which a virtual image can be observed) can be enlarged.

In addition, the head-up display device 10 of this embodiment is adapted to satisfy the following conditional expression (1).

$$2.5 < (Hf/Hn)/(Bf/Bn) < 15.0 \tag{1}$$

$$3.5 < (Hf/Hn)/(Bf/Bn) < 12.0 \tag{1-1}$$

Hf: the size of the primary display image in an arbitrary direction when the virtual image is displayed at the position of the farthest point farthest from the observer Hn: the size of the primary display image in the arbitrary direction when the virtual image is displayed at the position of the closest point closest to the observer Bf: the display magnification of the virtual image at the position of the farthest point Bn: the display magnification of the virtual image at the position of the closest point When the projection optical system 21 changes the position of the virtual image and changes the display size of the intermediate image by moving the formation position of the intermediate image so as to satisfy the conditional expression (1), the use range of the curved mirror 15 in a case in which the virtual image is displayed at the farthest point from the front window (image-reflecting surface) 13 becomes close to substantially the same range as the use range of the curved mirror 15 in a case in which the virtual image is displayed at the closest point as shown in FIG. 3. Accordingly, the curved mirror 15 can be reduced in size without the waste of the use range of the curved mirror 15, and the reduction of the size of the curved mirror 15 can contribute to a reduction in the size of the head-up display device.

In more detail, when the value of (Hf/Hn)/(Bf/Bn) is made not to be equal to or larger than the upper limit of the conditional expression (1), the use range of the curved mirror 15 in a case in which the virtual image is displayed at the farthest point can be made not to be excessively wider than the use range of the curved mirror 15 in a case in which the virtual image is displayed at the closest point. Accordingly, the curved mirror 15 can be reduced in size.

Further, when the value of (Hf/Hn)/(Bf/Bn) is made not to be equal to or smaller than the lower limit of the conditional expression (1), an excessive reduction in the size of the primary display image in a case in which the virtual image is displayed at the position of the farthest point can be suppressed. Accordingly, high display quality when the virtual image is displayed at the position of the farthest point can be maintained. Particularly, since a display region on the image display element needs to be small, that is, the number of pixels to be used for display needs to be reduced to reduce the size of the image in a case in which the primary display image is an image displayed on the image display element (exemplified in second to fourth embodiments to be described below), this is effective.

If the conditional expression (1-1) is satisfied, more satisfactory characteristics can be obtained.

Further, in the head-up display device 10 of this embodiment, the image display element 20 is fixed and a virtual image display position is changed by the projection optical system 21. Accordingly, since wires (not shown) connected to the image display element 20 do not need to be moved, structure can be simplified and problems, such as poor connection, caused by the movement of the wires can be avoided.

Figure 4:
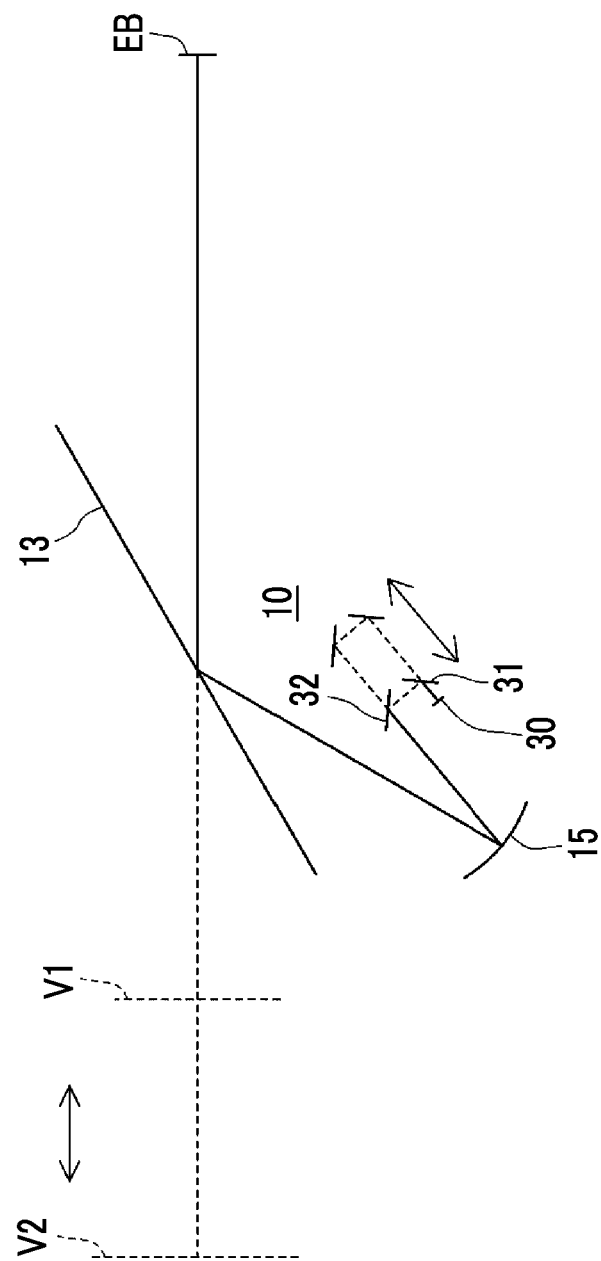
FIG. 4 is a diagram showing the schematic structure of a head-up display device according to a second embodiment of the invention.

Next, a second embodiment of the invention will be described in detail with reference to a drawing. FIG. 4 is a diagram showing the schematic structure of a head-up display device according to the second embodiment of the invention.

The head-up display device of the second embodiment is a head-up display device of which only the structure of a display unit for a primary display image is modified in comparison with the head-up display device of the first embodiment. Here, the description of portions, which are not modified from the head-up display device of the first embodiment, will be omitted.

In the head-up display device 10 of this embodiment, a primary display image is an image displayed on an image display element 30. An image display driver (not shown) changing the display size of the primary display image by changing the area of a portion, which is used at the time of display, of an image display region of the image display element 30 corresponds to the display-size change portion for changing the display size of the primary display image.

As shown in FIG. 4, the head-up display device 10 includes the image display element 30 and a curved mirror 15, and includes reflecting members 31 and 32, which are provided on a light path between the image display element 30 and the curved mirror 15 and change the length of the light path between the primary display image and the curved mirror 15, as the virtual-image-position change portion.

For example, a mirror can be used as each of the reflecting members 31 and 32, and any member, such as a prism, which can deflect the light path by reflecting light, other than a mirror may be used as each of the reflecting members 31 and 32.

As shown in FIG. 4, it is possible to shorten the length of the light path between the primary display image and the curved mirror 15 by making the reflecting members 31 and 32 be integrally close to the image display element 30 and to lengthen the length of the light path between the primary display image and the curved mirror 15 by making the reflecting members 31 and 32 be integrally distant from the image display element 30 (shown in FIG. 4 by a dotted line).

A method of changing the length of the light path between the primary display image and the curved mirror 15 by the reflecting members is not limited to the above-mentioned method, and may be any aspect, such as a method of changing the length of the light path between the primary display image and the curved mirror 15 by, for example, disposing reflecting members at four positions, that is, the positions of the reflecting members 31 and 32 of FIG. 4 and the positions to which the reflecting members 31 and 32 are to be moved (the positions of the reflecting members on the light path displayed in FIG. 4 by a dotted line) and inserting/removing the reflecting members 31 and 32 of FIG. 4 to/from the light path.

In addition, the head-up display device 10 of this embodiment is also adapted to satisfy the following conditional expression (1) and the same effects as the first embodiment can also be obtained from this structure.

$$2.5 < (Hf/Hn)/(Bf/Bn) < 15.0 \tag{1}$$

Further, even in the head-up display device 10 of this embodiment, the image display element 30 is fixed and a virtual image display position is changed by the reflecting members 31 and 32. Accordingly, since wires (not shown) connected to the image display element 30 do not need to be moved, structure can be simplified and problems, such as poor connection, caused by the movement of the wires can be avoided.

Next, a third embodiment of the invention will be described in detail with reference to a drawing. FIG. 5 is a diagram showing the schematic structure of a head-up display device according to the third embodiment of the invention.

The head-up display device of the third embodiment is a head-up display device of which only the structure of a display unit for a primary display image is modified in comparison with the head-up display device of the first embodiment. Here, the description of portions, which are not modified from the head-up display device of the first embodiment, will be omitted.

In the head-up display device 10 of this embodiment, a primary display image is an image displayed on an image display element 40. An image display driver (not shown) changing the display size of the primary display image by changing the area of a portion, which is used at the time of display, of an image display region of the image display element 40 corresponds to the display-size change portion for changing the display size of the primary display image.

As shown in FIG. 5, the head-up display device 10 includes the image display element 40 and a curved mirror 15, and includes a transparent medium 41, which is provided on a light path between the image display element 40 and the curved mirror 15 and changes the length of an air-conversion-light path between a primary display image and the curved mirror 15, as the virtual-image-position change portion.

For example, any member, such as a prism, which has a refractive index different from the refractive index of air, may be used as the transparent medium 41.

As shown in FIG. 5, the length of the air-conversion-light path between the primary display image and the curved mirror 15 is changed by the insertion/removal of the transparent medium 41 to/from the light path.

In addition, the head-up display device 10 of this embodiment is also adapted to satisfy the following conditional expression (1) and the same effects as the first embodiment can also be obtained from this structure.

$$2.5 < (Hf/Hn)/(Bf/Bn) < 15.0 \tag{1}$$

Further, even in the head-up display device 10 of this embodiment, the image display element 40 is fixed and a virtual image display position is changed by the transparent medium 41. Accordingly, since wires (not shown) connected to the image display element 40 do not need to be moved, structure can be simplified and problems, such as poor connection, caused by the movement of the wires can be avoided.

Next, a fourth embodiment of the invention will be described in detail with reference to a drawing. FIG. 6 is a top light-path view showing a positional relationship of main components of a head-up display device according to the fourth embodiment of the invention.

The head-up display device of the fourth embodiment is a head-up display device of which only the structure of a virtual-image-position change portion is modified in comparison with the head-up display device of the third embodiment. Here, the description of portions, which are not modified from the head-up display device of the third embodiment, will be omitted.

As shown in FIG. 6, the head-up display device 10 includes an image display element 50 and a curved mirror 15, and includes a lens 51, which is provided on the light path between the image display element 50 and the curved mirror 15 and changes the projection magnification of a primary display image at the curved mirror 15, as the virtual-image-position change portion.

Only one lens 51 is illustrated in FIG. 6, but the number and shapes of lenses are not limited thereto and may be arbitrary.

An optical conjugate relationship between the image display element 50 and a virtual image is changed by the change of the position of the lens 51 between the image display element 50 and the curved mirror 15 as shown in FIG. 6, so that a virtual image projection distance is changed. Accordingly, the projection magnification of a virtual image can be changed.

In addition, the head-up display device 10 of this embodiment is also adapted to satisfy the following conditional expression (1) and the same effects as the first embodiment can also be obtained from this structure.

$$2.5 < (Hf/Hn)/(Bf/Bn) < 15.0 \tag{1}$$

Further, even in the head-up display device 10 of this embodiment, the image display element 50 is fixed and a virtual image display position is changed by the lens 51.

Accordingly, since wires (not shown) connected to the image display element 50 do not need to be moved, structure can be simplified and problems, such as poor connection, caused by the movement of the wires can be avoided.

Furthermore, a method of changing an optical conjugate relationship between a primary display image and the curved mirror 15 by the lens is not limited to an aspect in which the primary display image is an image displayed on the image display element, and can also be combined with an aspect in which a primary display image is an image obtained by forming an image, which is displayed on the image display element, as an intermediate image with a projection optical system as in the first embodiment.

Next, numerical examples of the head-up display device of the invention will be described.

First, a head-up display device of Example 1 will be described. The head-up display device of Example 1 corresponds to the first or second embodiment. Table 1 shows data about specifications.

An upper table of Table 1 shows the radius of curvature (mm) of each surface of a main component, a distance (mm) on an optical axis between each surface and the next surface, and information about the material of each surface, in this order from the left. d1 and d2 are written in columns of distance, in which an interval is changed at the time of the change of a virtual image display position. Numerals corresponding to d1 (mm) and d2 (mm) are shown in a lower table of Table 1. And mm represents millimeter.

A lower table of Table 1 shows d1 (mm), d2 (mm), the size (mm) of the primary display image in a horizontal direction, a display magnification, the effective size (mm) of the curved mirror in the horizontal direction, the size (mm) of the eye box in the horizontal direction, the angle of view (deg.) from the central position of the eye box, and the numerical of the conditional expression (1) in this order from the left in a case in which a virtual image is displayed at the farthest point and a case in which a virtual image is displayed at the closest point.

Since symbol, meaning and description method of each data mentioned in the description of Example 1 are the same as those in the following examples as long as not particularly specified, the repeated description thereof will be omitted below.

TABLE 1

|  | Radius of curvature | Distance | Material |
|---|---|---|---|
| Position of virtual image | ∞ | d1 | air |
| Eye point | ∞ | −1100 | air |
| Curved mirror | 2000 | d2 | mirror |
| Position of primary display image | ∞ |  |  |

|  | d1 | d2 | Size of primary display image | Display magnification | Effective size of mirror | Size of eye box | Angle of view (deg.) | Conditional expression (1) |
|---|---|---|---|---|---|---|---|---|
| Farthest point | 10000 | 898.98 | 123.4 | 0.1010 | 294 | 180 | 7.0 | 5.0 |
| Closest point | 2000 | 473.68 | 128.6 | 0.5263 | 215 | 180 | 7.0 |  |

Next, a head-up display device of Example 2 will be described. The head-up display device of Example 2 corresponds to the first or second embodiment. Table 2 shows data about specifications.

TABLE 2

|  | Radius of curvature | Distance | Material |
|---|---|---|---|
| Position of virtual image | ∞ | d1 | air |
| Eye point | ∞ | −1100 | air |
| Curved mirror | 1000 | d2 | mirror |
| Position of primary display image | ∞ |  |  |

|  | d1 | d2 | Size of primary display image | Display magnification | Effective size of mirror | Size of eye box | Angle of view (deg.) | Conditional expression (1) |
|---|---|---|---|---|---|---|---|---|
| Farthest point | 20000 | 487.11 | 63.1 | 0.0258 | 607 | 180 | 7.0 | 10.0 |
| Closest point | 2000 | 321.43 | 87.4 | 0.3571 | 431 | 180 | 7.0 |  |

Next, a head-up display device of Example 3 will be described. The head-up display device of Example 3 corresponds to the first or second embodiment. Table 3 shows data about specifications.

TABLE 3

|  | Radius of curvature | Distance | Material |
|---|---|---|---|
| Position of virtual image | ∞ | d1 | air |
| Eye point | ∞ | −1100 | air |
| Curved mirror | 1000 | d2 | mirror |
| Position of primary display image | ∞ | | |

|  | d1 | d2 | Size of primary display image | Display magnification | Effective size of mirror | Size of eye box | Angle of view (deg.) | Conditional expression (1) |
|---|---|---|---|---|---|---|---|---|
| Farthest point | 20000 | 487.11 | 54.0 | 0.0258 | 162 | 50 | 6.0 | 8.6 |
| Closest point | 2000 | 321.43 | 87.4 | 0.3571 | 157 | 50 | 7.0 | |

Next, a head-up display device of Example 4 will be described. The head-up display device of Example 4 corresponds to the first or second embodiment. Table 4 shows data about specifications.

TABLE 4

|  | Radius of curvature | Distance | Material |
|---|---|---|---|
| Position of virtual image | ∞ | d1 | air |
| Eye point | ∞ | −1100 | air |
| Curved mirror | 500 | d2 | mirror |
| Position of primary display image | ∞ | | |

|  | d1 | d2 | Size of primary display image | Display magnification | Effective size of mirror | Size of eye box | Angle of view (deg.) | Conditional expression (1) |
|---|---|---|---|---|---|---|---|---|
| Farthest point | 8000 | 241.26 | 34.2 | 0.0350 | 219 | 50 | 7.0 | 5.3 |
| Closest point | 1500 | 153.85 | 71.1 | 0.3846 | 161 | 50 | 7.0 | |

Next, a head-up display device of Example 5 will be described. The head-up display device of Example 5 corresponds to the first or second embodiment. Table 5 shows data about specifications.

TABLE 5

|  | Radius of curvature | Distance | Material |
|---|---|---|---|
| Position of virtual image | ∞ | d1 | air |
| Eye point | ∞ | −1100 | air |
| Curved mirror | 400 | d2 | mirror |
| Position of primary display image | ∞ | | |

|  | d1 | d2 | Size of primary display image | Display magnification | Effective size of mirror | Size of eye box | Angle of view (deg.) | Conditional expression (1) |
|---|---|---|---|---|---|---|---|---|
| Farthest point | 15000 | 197.16 | 14.8 | 0.0148 | 243 | 180 | 4.0 | 5.4 |
| Closest point | 1500 | 133.33 | 61.8 | 0.3333 | 183 | 180 | 7.0 | |

Next, a head-up display device of Example 6 will be described. The head-up display device of Example 6 corresponds to the first or second embodiment. Table 6 shows data about specifications.

TABLE 6

|  | Radius of curvature | Distance | Material |
|---|---|---|---|
| Position of virtual image | ∞ | d1 | air |
| Eye point | ∞ | −1100 | air |
| Curved mirror | 300 | d2 | mirror |
| Position of primary display image | ∞ | | |

TABLE 6-continued

|  | d1 | d2 | Size of primary display image | Display magnification | Effective size of mirror | Size of eye box | Angle of view (deg.) | Conditional expression (1) |
|---|---|---|---|---|---|---|---|---|
| Farthest point | 15000 | 148.40 | 13.6 | 0.0107 | 169 | 80 | 5.0 | 5.8 |
| Closest point | 1800 | 123.53 | 38.8 | 0.1765 | 165 | 80 | 7.0 | |

Next, a head-up display device of Example 7 will be described. The head-up display device of Example 7 corresponds to the first or second embodiment. Table 7 shows data about specifications.

TABLE 7

|  | Radius of curvature | Distance | Material |
|---|---|---|---|
| Position of virtual image | ∞ | d1 | air |
| Eye point | ∞ | −1100 | air |
| Curved mirror | 200 | d2 | mirror |
| Position of primary display image | ∞ | | |

|  | d1 | d2 | Size of primary display image | Display magnification | Effective size of mirror | Size of eye box | Angle of view (deg.) | Conditional expression (1) |
|---|---|---|---|---|---|---|---|---|
| Farthest point | 10000 | 98.89 | 8.9 | 0.0111 | 219 | 100 | 7.0 | 4.1 |
| Closest point | 1700 | 85.71 | 27.6 | 0.1429 | 169 | 100 | 7.0 | |

Next, a head-up display device of Example 8 will be described. The head-up display device of Example 8 corresponds to the fourth embodiment. Table 8 shows data about specifications.

TABLE 8

|  | Radius of curvature | Distance | Material |
|---|---|---|---|
| Position of virtual image | ∞ | d1 | air |
| Eye point | ∞ | −1100 | air |
| Curved mirror | 636.33 | d2 | mirror |
| Lens | 112.74 | 25.97 | Nd = 1.49529 vd = 25.4 |
|  | 185.82 | d3 | |
| Position of primary display image | ∞ | | |

|  | d1 | d2 | d3 | Size of primary display image | Display magnification | Effective size of mirror | Size of eye box | Angle of view (deg.) | Conditional expression (1) |
|---|---|---|---|---|---|---|---|---|---|
| Farthest point | 11000 | 101.35 | 98.46 | 25.1 | 0.0200 | 293 | 180 | 7.0 | 5.3 |
| Closest point | 1900 | 169.79 | 30.01 | 54.3 | 0.2277 | 210 | 180 | 7.0 | |

It is known from the above-mentioned data that all the head-up display devices of Examples 1 to 8 are head-up display devices that can change a virtual image display position and are small since all the head-up display devices of Examples 1 to 8 satisfy the conditional expression (1).

The invention has been described above using the embodiments and examples but can have various modifications without being limited to the embodiments and examples. For example, the position and/or size of each element of the head-up display device are not limited to the values described in each of numerical examples, and other values may be taken as the position and size of each element. Further, the structure of the virtual-image-position change portion is not limited to an aspect in which the reflecting members are used alone, an aspect in which the transparent medium is used alone, and an aspect in which lenses are used alone, and these aspects can also be appropriately combined.

EXPLANATION OF REFERENCES

10: head-up display device
11: automobile
12: dashboard
13: front window
14: driver
15: curved mirror
20: image display element
21: projection optical system
30: image display element
31, 32: reflecting member
40: image display element
41: transparent medium
50: image display element
51: lens
100: image display element
101: curved mirror
EB: eye box GF: front group
GR: rear group
P1: intermediate image display position corresponding to closest-point-virtual image
P2: intermediate image display position corresponding to farthest-point-virtual image
V1: closest-point-virtual image
V2: farthest-point-virtual image

What is claimed is:

1. A head-up display device that reflects and enlarges a displayed primary display image by a curved mirror to allow an observer to visually recognize the primary display image as a virtual image, the head-up display device comprising:
a virtual-image-position changer configured to change a distance between the observer and the virtual image; and
a display-size changer configured to change a display size of the primary display image,
wherein the following conditional expression (1) is satisfied:

$$2.5 < (Hf/Hn)/(Bf/Bn) < 15.0 \qquad (1)$$

where, Hf: a size of the primary display image in an arbitrary direction when the virtual image is displayed at a position farthest from the observer,
Hn: the size of the primary display image in the arbitrary direction when the virtual image is displayed at a position closest to the observer,
Bf: a display magnification of the virtual image at the position farthest from the observer, and
Bn: the display magnification of the virtual image at the position closest to the observer, and
wherein
the size of the primary display image in the arbitrary direction indicates the size of either of a horizontal size and a vertical size of the primary display image corresponding to a horizontal direction and a vertical direction at a time of display of a virtual image, and
the display magnification of the virtual image pertains to a ratio of the size of the primary display image in relation to the display size of the virtual image in the arbitrary direction.

2. The head-up display device according to claim 1, wherein the following conditional expression (1-1) is satisfied:

$$3.5 < (Hf/Hn)/(Bf/Bn) < 12.0 \qquad (1\text{-}1).$$

3. The head-up display device according to claim 2, wherein the primary display image is an image that is formed as an intermediate image on the basis of image information by an optical system.

4. The head-up display device according to claim 3, further comprising:
a diffuser that is provided at a formation position of the intermediate image.

5. The head-up display device according to claim 4, wherein the optical system is a projection optical system that forms an image, which is displayed on an image display element, as the intermediate image, and
the projection optical system includes a plurality of lenses, changes the position of the virtual image by moving at least a part of the lenses along an optical axis to move the formation position of the intermediate image, and functions as the virtual-image-position changer.

6. The head-up display device according to claim 4, wherein the optical system is a projection optical system that forms an image, which is displayed on the image display element, as the intermediate image, and
the projection optical system includes a plurality of lenses, changes the display size of the intermediate image by moving at least a part of the lenses along the optical axis, and functions as the display-size changer.

7. The head-up display device according to claim 3, wherein the optical system is a projection optical system that forms an image, which is displayed on an image display element, as the intermediate image, and
the projection optical system includes a plurality of lenses, changes the position of the virtual image by moving at least a part of the lenses along an optical axis to move the formation position of the intermediate image, and functions as the virtual-image-position changer.

8. The head-up display device according to claim 7, wherein the optical system is a projection optical system that forms an image, which is displayed on the image display element, as the intermediate image, and
the projection optical system includes a plurality of lenses, changes the display size of the intermediate image by moving at least a part of the lenses along the optical axis, and functions as the display-size changer.

9. The head-up display device according to claim 3, wherein the optical system is a projection optical system that forms an image, which is displayed on the image display element, as the intermediate image, and
the projection optical system includes a plurality of lenses, changes the display size of the intermediate image by moving at least a part of the lenses along the optical axis, and functions as the display-size changer.

10. The head-up display device according to claim 1, wherein the primary display image is an image that is formed as an intermediate image on the basis of image information by an optical system.

11. The head-up display device according to claim 10, further comprising:
a diffuser that is provided at a formation position of the intermediate image.

12. The head-up display device according to claim 11, wherein the optical system is a projection optical system that forms an image, which is displayed on an image display element, as the intermediate image, and
the projection optical system includes a plurality of lenses, changes the position of the virtual image by moving at least a part of the lenses along an optical axis to move the formation position of the intermediate image, and functions as the virtual-image-position changer.

13. The head-up display device according to claim 11, wherein the optical system is a projection optical system that forms an image, which is displayed on the image display element, as the intermediate image, and
the projection optical system includes a plurality of lenses, changes the display size of the intermediate image by moving at least a part of the lenses along the optical axis, and functions as the display-size changer.

14. The head-up display device according to claim 10, wherein the optical system is a projection optical system that forms an image, which is displayed on an image display element, as the intermediate image, and
the projection optical system includes a plurality of lenses, changes the position of the virtual image by moving at least a part of the lenses along an optical axis to move the formation position of the intermediate image, and functions as the virtual-image-position changer.

15. The head-up display device according to claim 14,
wherein the optical system is a projection optical system that forms an image, which is displayed on the image display element, as the intermediate image, and
the projection optical system includes a plurality of lenses, changes the display size of the intermediate image by moving at least a part of the lenses along the optical axis, and functions as the display-size changer.

16. The head-up display device according to claim 10,
wherein the optical system is a projection optical system that forms an image, which is displayed on the image display element, as the intermediate image, and
the projection optical system includes a plurality of lenses, changes the display size of the intermediate image by moving at least a part of the lenses along the optical axis, and functions as the display-size changer.

17. The head-up display device according to claim 1,
wherein the primary display image is an image displayed on an image display element.

18. The head-up display device according to claim 1,
wherein a reflector, which is provided on a light path between the primary display image and the curved mirror and changes the length of the light path between the primary display image and the curved mirror, is provided as the virtual-image-position changer.

19. The head-up display device according to claim 1,
wherein a transparent medium, which is provided on a light path between the primary display image and the curved mirror and changes the length of an air-conversion-light path between the primary display image and the curved mirror, is provided as the virtual-image-position changer.

20. The head-up display device according to claim 1,
wherein a lens, which is provided on a light path between the primary display image and the curved mirror and changes a projection magnification of the primary display image at the curved mirror, is provided as the virtual-image-position changer.

\* \* \* \* \*